(12) United States Patent
Potter et al.

(10) Patent No.: US 6,179,179 B1
(45) Date of Patent: Jan. 30, 2001

(54) VEHICLE ARTICLE CARRIER HAVING NON-BINDING ADJUSTABLE CROSS BAR

(75) Inventors: Donald R. Potter, Clarkston; Jeffrey M. Aftanas, Ortonville, both of MI (US)

(73) Assignee: JAC Products, Inc., Ann Arbor, MI (US)

( * ) Notice: Under 35 U.S.C. 154(b), the term of this patent shall be extended for 0 days.

(21) Appl. No.: 09/375,992

(22) Filed: Aug. 17, 1999

(51) Int. Cl.[7] ........................................... B60R 9/00
(52) U.S. Cl. ............................ 224/321; 224/326
(58) Field of Search ............................ 224/321, 322, 224/325, 326, 309, 329, 330, 331

(56) References Cited

U.S. PATENT DOCUMENTS 5,715,980 * 2/1998 Blankenburg et al. .............. 224/321

FOREIGN PATENT DOCUMENTS

094010007 * 5/1994 (WO) ................................. 224/321

* cited by examiner

*Primary Examiner*—Stephen K. Cronin
(74) *Attorney, Agent, or Firm*—Harness, Dickey & Pierce, PLC

(57) ABSTRACT

A vehicle article carrier having a pair of side rails each including a channel, and an adjustable cross bar disposed between the side rails, wherein the cross bar includes structure for eliminating binding of the cross bar when same is moved along the side rails. The cross bar includes a pair of guide wheel assemblies disposed at opposite ends of a bracket assembly. The bracket assembly is secured to one outermost end of the cross bar. The guide wheel assemblies reside within the channel of the side rail and prevent binding of the structure of the bracket assembly that resides within the channel of the side rail as the cross bar is moved along the side rails and becomes non-perpendicular to the side rails. The guide wheels are disposed generally horizontally and do not perform any load bearing function, but rather enable the bracket assemblies to be moved easily along the side rails without binding.

20 Claims, 4 Drawing Sheets

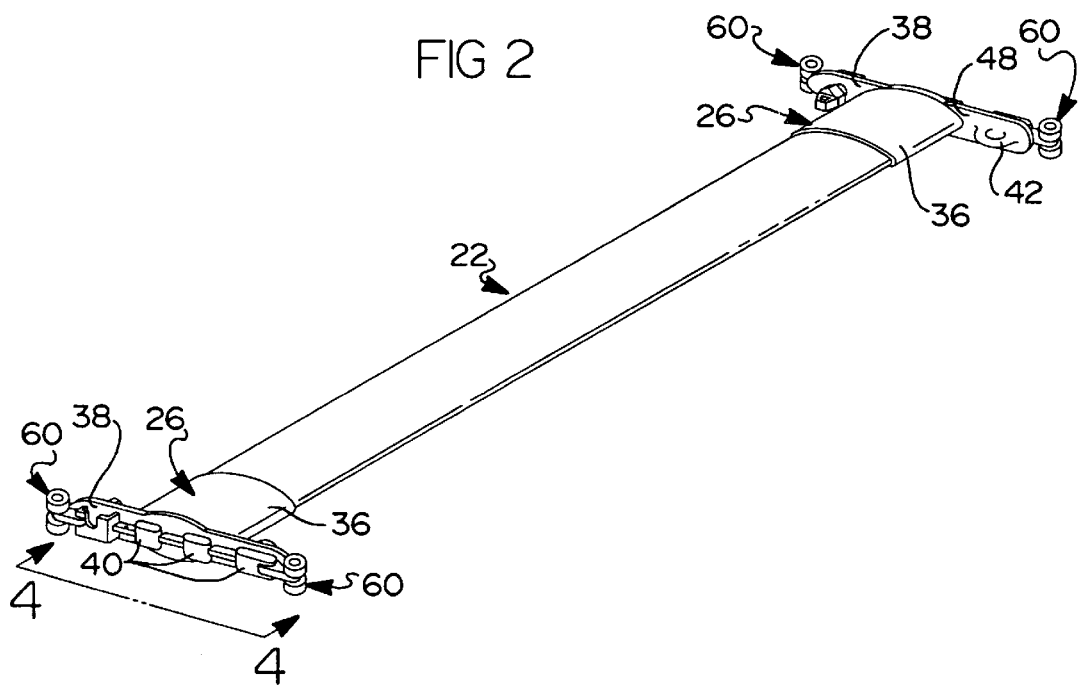
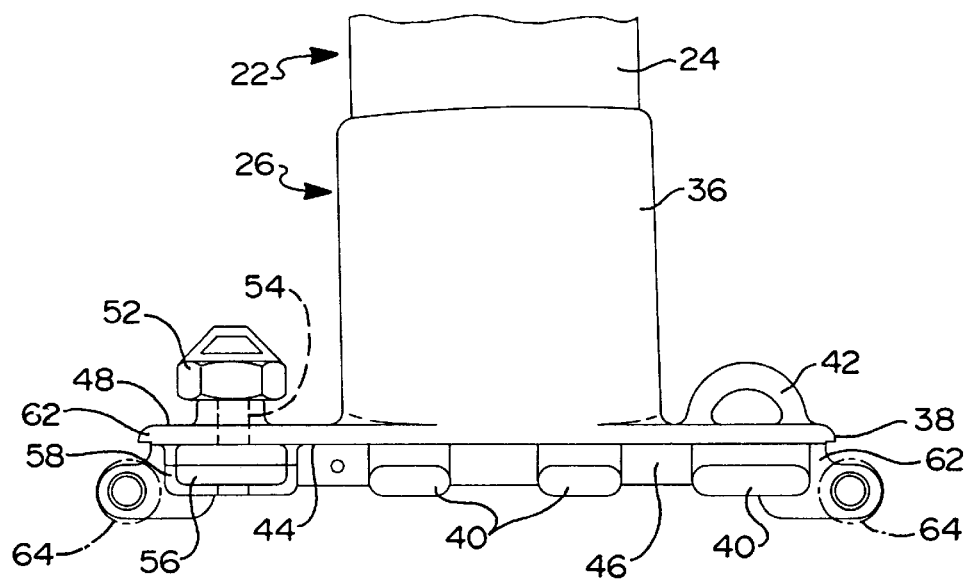

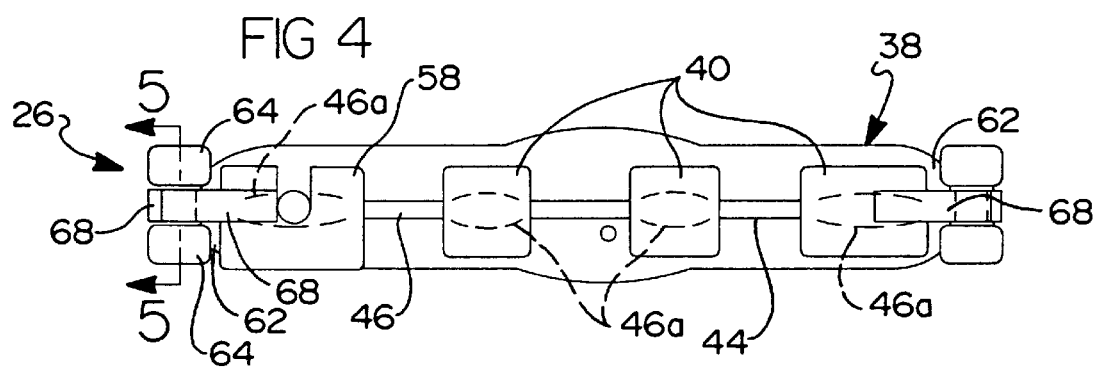
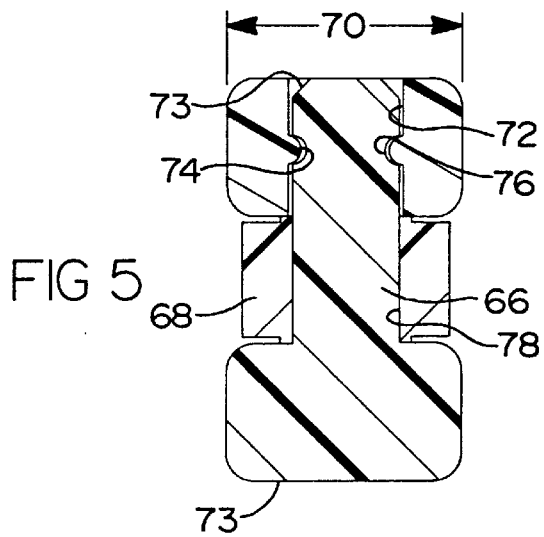
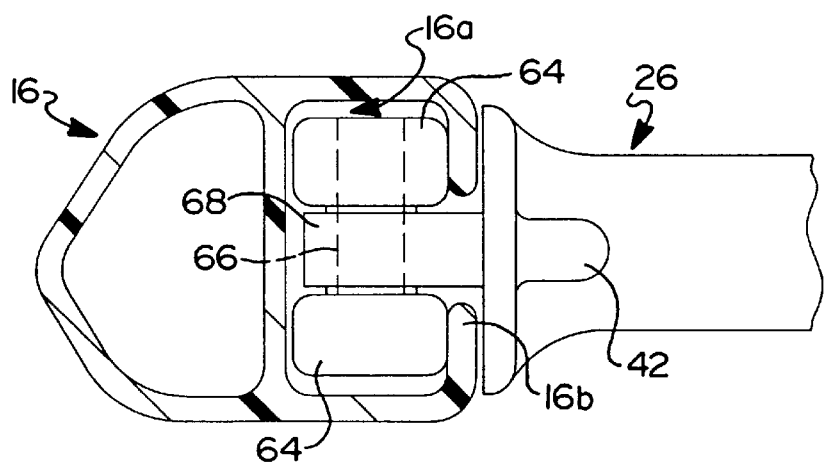

VEHICLE ARTICLE CARRIER HAVING NON-BINDING ADJUSTABLE CROSS BAR

BACKGROUND OF THE INVENTION

Technical Field

This invention relates to vehicle article carriers, and more particularly to a vehicle article carrier having a pair of elevated side rails and a cross bar extending therebetween, in which the cross bar can be repositioned along the side rails from one side of the vehicle without binding of the cross bar as it is moved along the side rails.

DISCUSSION

Vehicle article carriers are used in a wide variety of applications to transport various forms of cargo thereon above an outer body surface of a vehicle. Typically, such vehicle article carriers incorporate a pair of elongated side rails which are disposed generally parallel to one another and fixedly secured to an outer body surface of a vehicle such that a major portion of each side rail extends above the outer body surface. One or more cross bars are positioned between the side rails. Each cross bar typically has some form of supporting structure at each outermost end thereof. The side rails further typically include channels which receive portions of the supporting structure at each end of the cross bar. In this manner the cross bar is supported by the side rails elevationally above the outer body surface.

Typically, at least one cross bar is adjustable on the side rails. This enables a user to reposition the cross bar as needed to suit various size loads or cargo items that need to be transported. Each supporting structure further typically includes some form of locking mechanism to allow each supporting structure to be secured at desired point along the side rails.

When repositioning a side rail such as described above, the user typically grasps the cross bar at one end thereof from one side of the vehicle and attempts to move the cross bar longitudinally along the side rails. However, the friction from the components of each supporting structure which are disposed within the channels of the side rails can cause "binding" of the cross bar. By "binding" it is meant that one end or the other of the cross bar periodically becomes momentarily jammed because of the slightly non-perpendicular positioning of the cross bar relative to the side rails, and the resulting friction caused by engagement of various surfaces of the supporting structures within the channels of the side rails. Thus, the user often cannot simply slide the cross bar easily from one end thereof along the side rails but must instead walk back and forth between both sides of the vehicle moving first one end of the cross bar and then the opposite end from the other side of the vehicle to gradually move the cross bar to the desired position on the side rails. Even when movement of the cross bar from one end thereof can be accomplished, such adjustment is not easily accomplished because the user has to exert a twisting force on the cross bar to compensate for the repeated binding that occurs at each end of the cross bar.

Accordingly, it is a principal object of the present invention to provide a vehicle article carrier having a pair of side rails which include at least one adjustable cross bar, where the cross bar may be repositioned easily from one side of the vehicle without encountering any binding or jamming of the support assemblies at the outer ends of the cross bar as they move slidably along the side rails.

It is a further object of the present invention to provide a vehicle article carrier having a pair of side rails and at least one adjustable cross bar, where the cross bar includes structure capable of eliminating binding thereof as it is moved slidably along the side rails through the use of structure at each end of the cross bar, and where the structure does not significantly increase the cost, weight or complexity of the cross bar.

It is still a further object of the present invention to provide a vehicle article carrier having a pair of side rails and at least one adjustable cross bar, and where the cross bar can be used with a conventional side rail having a longitudinally extending channel formed therein without modification to the side rail, and which further eliminates binding as the cross bar is moved slidably along the side rails.

SUMMARY OF THE INVENTION

The above and other objects are provided by a vehicle article carrier in accordance with a preferred embodiment of the present invention. The vehicle article carrier comprises a pair of side rails which are adapted to be secured to an outer body surface of a vehicle and at least one cross bar which is disposed between the side rails. The side rails each incorporate channels which extend along a major portion of the length thereof. The cross bar includes a bracket assembly at each outermost end thereof. Each bracket assembly includes at least one guide wheel assembly incorporating one or more horizontally disposed wheels. A portion of the bracket assembly together with the wheels are disposed within the channel of an associated one of the side rails. The wheels do not bear any load but rather serve to prevent binding of the bracket assembly relative to its associated side rail as the cross bar is moved slidably along the side rails when being repositioned on the side rails.

In one preferred embodiment the bracket assembly includes a base which rides within a channel of an associated one of the side rails. The base includes a pair of guide wheel assemblies at opposite ends thereof. Each guide wheel assembly comprises a pair of horizontally disposed guide wheels which make contact with interior surfaces of an associated one of the side rails when the cross bar is moved along the side rails to prevent binding of the ends of the cross bar.

An advantage of the preferred embodiments described above is that regardless of the number of guide wheels incorporated, none of the guide wheels are used to bear the load of the cross bar and/or cargo being supported on the cross bar. Thus, no bearings are required for the guide wheels. Furthermore, because the guide wheels are not required to bear the weight of the cross bar and any objects positioned thereon, the guide wheels can be constructed from relatively inexpensive materials.

The preferred embodiments enable a cross bar to be slidably repositioned by a user wheel standing on one side of a vehicle and grasping one end of the cross bar without the objectionable binding that would otherwise occur with other forms of cross bars. The present invention further accomplishes this with a limited number of inexpensive, additional component parts and without requiring modifications to the side rails. Since the present invention is able to be used with conventional side rails, it can also be retrofitted to pre-existing vehicle article carriers.

BRIEF DESCRIPTION OF THE DRAWINGS

The various advantages of the present invention will become apparent to one skilled in the art by reading the following specification and subjoined claims and by referencing the following drawings in which:

FIG. 2 is a perspective view of the cross bar of the vehicle article carrier of FIG. 1;

FIG. 3 is a plan view of one bracket assembly of the present invention with the guide wheels thereof drawn in phantom to better illustrate the structure used to support the guide wheels;

FIG. 4 is an end view of the cross bar of FIG. 2 taken in accordance with directional line 4 in FIG. 2;

FIG. 5 is a cross sectional side view of one of the guide wheel assemblies taken in accordance with section line 5—5 in FIG. 4;

FIG. 6 is a cross sectional end view of one of the side rails illustrating one of the guide wheel assemblies disposed therein, and taken in accordance with section line 6—6 in FIG. 1.

DETAILED DESCRIPTION OF THE PREFERRED EMBODIMENTS

Figure 1:
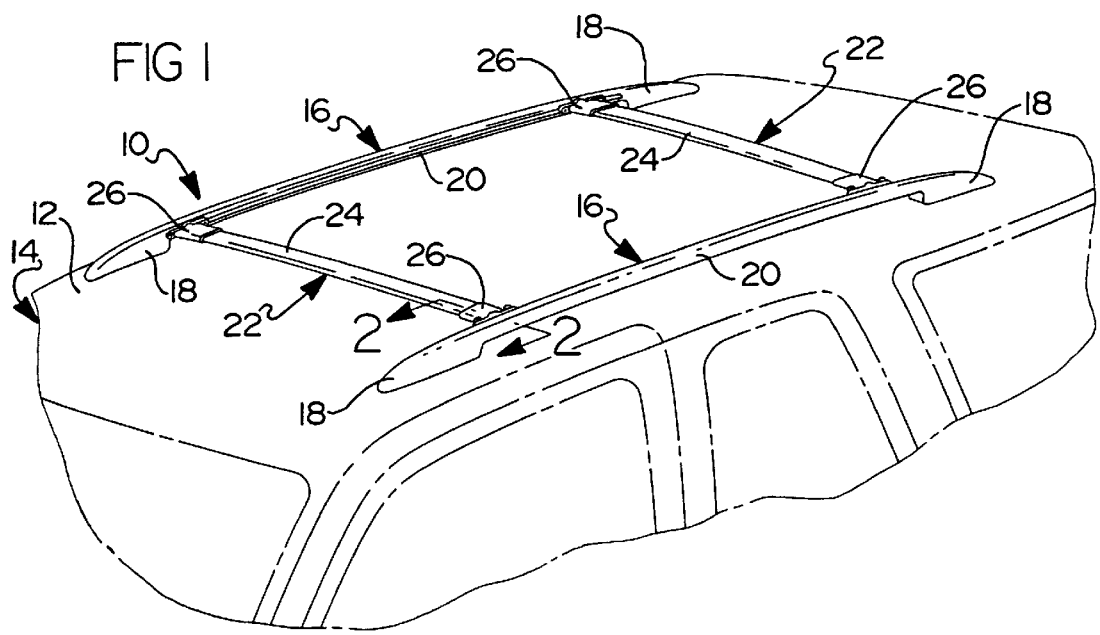
FIG. 1 is a perspective view of a portion of a vehicle with a vehicle article carrier in accordance with a preferred embodiment of the present invention disposed on an outer body surface of the vehicle.

Referring to FIG. 1, there is shown a vehicle article carrier 10 in accordance with a preferred embodiment of the present invention secured to an outer body surface 12 of a vehicle 14. While the vehicle article carrier 10 is illustrated as being secured to a roof portion of a vehicle, it will be appreciated that the invention could just as readily be secured to other outer body surfaces of a vehicle such as a rear deck lid or even over a bed of a pick-up truck.

The vehicle article carrier 10 includes a pair of side rails 16 each having a pair of supports 18. The supports 18 are fixedly secured to the outer body surface 12 so as to support each of the central portions 20 of each side rail 16 above the outer body surface 12. The side rails 16 each have a channel 16a (shown in FIG. 6) and are further disposed parallel to one another so as to extend along a major longitudinal length of the vehicle 14.

The vehicle article carrier 10 further includes at least one cross bar 22, and more preferably a pair of cross bars 22, each being secured at outermost ends thereof to the side rails 16. While FIG. 1 illustrates both of the cross bars 22 as being adjustable, it will be appreciated that one may be fixed to the side rails 16 so as to be immovable while the other cross bar is supported for adjustable movement along the side rails 16.

Each cross bar 22 includes a central portion 24 and a pair of bracket assemblies 26 fixedly secured to each outermost end of the central portion 24. Each bracket assembly 26 is operable to engage with an associated one of the side rails 16 to enable the cross bar 22 to be supported by the side rail 16 above the outer body surface 12. The bracket assemblies 26 further permit each cross bar 22 to be moved slidably along the channel 16a of each side rail 16 when it is desired to reposition the cross bar 22 on the side rails 16.

Figure 1A:
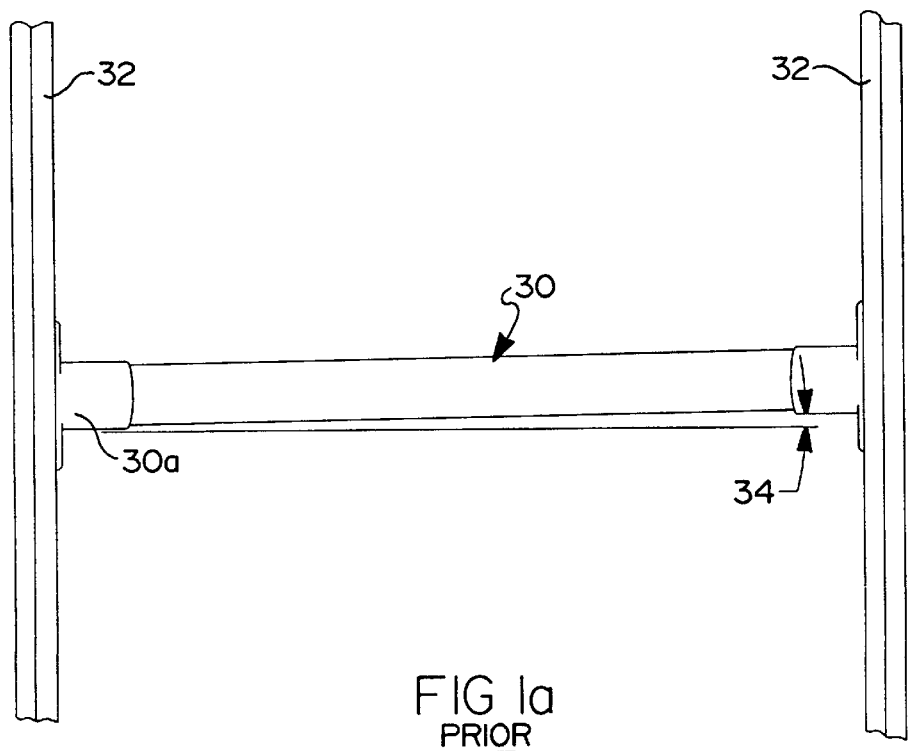
FIG. 1a is a plan view of the vehicle article carrier of FIG. 1 illustrating the binding of the cross bar that can occur with previously developed vehicle article carriers as the cross bar is moved along a pair of side rails.

With specific reference to FIG.1a, with previously developed vehicle article carriers, "binding" can occur when a cross bar 30 is moved slidably along a pair of parallel side rails 32. This binding occurs when the cross bar 30 becomes momentarily and slightly non-perpendicular to the side rails 32, as indicated by angle 34. The non-perpendicularity occurs when the user grasps the cross bar at one end 30a thereof and attempts to slide the entire cross bar 30 along the side rails 32. It is difficult, if not impossible, to maintain the cross bar 30 perfectly perpendicular to the side rails 32 as it is moved slidably, and the non-perpendicularity causes structure of the cross bar sliding within the channels of the side rails 32 (which are identical in construction to side rails 16) to engage interior surfaces of the channels of the side rails 32, thus causing friction and binding of the supporting structure against the interior surfaces of the side rail channels. Thus, the user typically is required to adjust first one side of the cross bar 30 and then walk around to the opposite side of the vehicle 14 to adjust the opposite end of the cross bar, and to repeat this process several times while moving the cross bar 30 along the side rails 32 one end at a time.

Referring now to FIGS. 2–4, the above-described binding problem is eliminated by structure incorporated on each bracket assembly 26 of the cross bar assembly 22. In one preferred embodiment of the cross bar assembly 22 each bracket assembly 26 includes a neck portion 36 and an integrally formed base portion 38. It will be appreciated however, that the neck portion 36 and base portion 38 could be formed as separate components and secured together via fasteners or other components. The base portion 38 includes preferably a plurality of T-lugs 40 projecting from a rear surface 44 of the base 38 which ride within the channel 16a of an associated one of the side rails 16 and which maintain the cross bar 22 secured to the side rails 16. A longitudinally extending shoulder 46 also projects from the rear surface 44 for supporting the entire cross bar 22 on its associated side rail 16. Portions 46a of the shoulder 46 have an arcuate shape which serves to minimize the contact area with the lip of the side rail 16 when the bracket assembly 26 is being supported on the side rail. This helps to reduce the sliding friction when moving the cross bar 22 along the side rails 16. A front surface 48 of the base portion 38 may also optionally include an integrally formed tie-down loop 42 for allowing bunge cords or other like fastening elements to be used with the cross bar 22 to secure cargo on the cross bar.

Referring specifically to FIGS. 2 and 3, a rotatable tie-down element 52 having a threaded shaft 54 is also preferably included for engaging with a tap plate 56 to enable the bracket assembly 26 to be clamped to an associated side rail 16 at a desired position. Preferably, the tap plate 56 is enclosed within a pocket 58 formed on the rear surface 44 to prevent the tap plate 56 from rotating as the tie down element 52 is rotated during tightening or loosening of the element 52.

With further reference to FIGS. 2–5, the base 38 includes a pair of horizontally disposed guide wheel assemblies 60 at opposite ends 62 thereof. Each guide wheel assembly 60 includes a pair of guide wheels 64. One guide wheel 64 is preferably integrally formed with a shaft 66. The other guide wheel 64a is formed as an independent component and rotatably supported on an opposite end of the shaft 66 (best shown in FIG. 5) on opposite sides of a laterally projecting planar arm 68. The arm 68 is preferably integrally formed with the base portion 38 of the bracket assembly 26 such that it extends from the rear surface 44 and places each guide wheel assembly 60 slightly outwardly of the outermost ends 62 of the base portion 38. It will be appreciated immediately that the shaft 66 could be formed independently of the two guide wheels, rather than integrally with one of the wheels as shown in FIG. 6.

Referring specifically to FIG. 5, each guide wheel 64 preferably comprises a nylon or plastic wheel having a diameter, indicated by arrow 70, which is slightly less than the interior width of the channel 16. Guide wheel 64a includes a bore 72 having a circumferential rib or shoulder portion 74. The shoulder portion 74 is adapted to engage within a groove 76 formed in the shaft 66 so that wheel 64a can be secured at the end of the shaft 66 without any external fasteners. Thus, wheel 64a may be secured to the shaft 66 simply by pressing the wheel 64a onto and over an end of the shaft 66 until the circumferential shoulder portion 74 thereof engages in groove 76. A beveled edge 73 at one end of the shaft 66 assists in allowing the independent wheel 64a to be pressed onto one end of the shaft 66.

Referring to FIGS. 4 and 5, during assembly the shaft 66 is inserted within a bore 78 in one of the planar arms 68. Then the independent wheel 64a is inserted onto the free end of the shaft 66. Advantageously, no bearings are required since the wheels 64 are not required to be load bearing, as will be described further in the following paragraphs.

Referring now to FIG. 6, one of the bracket assemblies 26 can be seen engaged with the channel 16a of one of the side rails 16. The bracket assembly 26 is supported on a lip 16b of the side rail 16 by the arcuate portions 46a of the longitudinally extending shoulder 46. In this manner, the wheels 64 do not bear the load of the cross bar 22 and the articles supported thereon. Thus, no bearings are required in connection with the wheels 64. It will also be noted that the diameter of the wheels 64 is such that only a very small clearance exists between the outer surfaces of the wheels 64 and the interior surfaces of the channel 16a.

Figure 7:
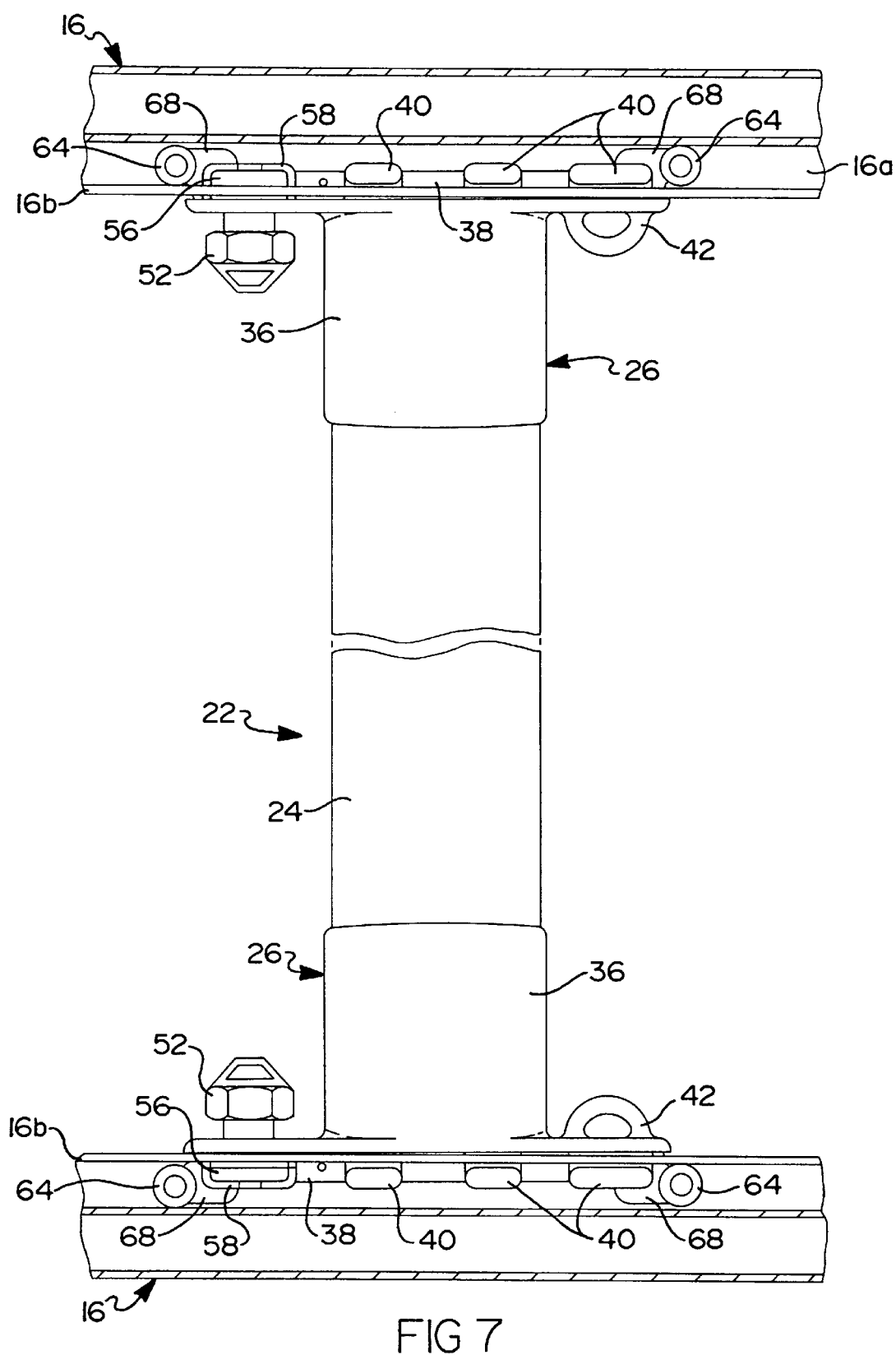
FIG. 7 is a plan view showing the side rails in cross section and illustrating how the guide wheel assemblies help to maintain perpendicularity of the cross bar to the side rails and to prevent binding as the cross bar is moved along the side rails.

Referring now to FIG. 7, as the cross bar assembly 22 is moved along the side rails 16 and becomes slightly non-perpendicular, it can be seen how the wheels 64 contact opposing interior wall surfaces of the channels 16a to limit the non-perpendicularity of the cross bar 22. The wheels 64, being rotationally mounted relative to each other, prevent the binding that would otherwise occur as the cross bar 22 becomes non-perpendicular to the side rails 16 while being moved. This provides a smooth, sliding movement to be achieved when the cross bar 22 is moved from one side thereof along the side rails 16.

The vehicle article carrier 10 of the present invention thus provides a means for preventing binding of a cross bar as the cross bar is moved longitudinally slidably along the channels of a pair of side rails. The vehicle article carrier 10 of the present invention accomplishes this with only a limited number of additional component parts, and without significantly increasing the complexity, cost or weight of a cross bar and further without complicating the assembly of the cross bar to the side rails. Importantly, since the wheels 64 of the present invention are disposed in a horizontal orientation, they are not required to bear the weight of the cross bar 22, which eliminates the need for bearings to be used with the wheels 64 and reduces the wear on the wheels.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of a vehicle, said apparatus comprising:
   a pair of side rails adapted to be secured to said outer body surface and disposed generally parallel to one another along said outer body surface, each said side rail having a channel extending along at least a major portion of the length thereof;
   a cross bar having a length substantially sufficient to span the distance between said side rails;
   a support bracket assembly disposed at each end of said cross bar, at least one of said support bracket assemblies including:
      a base having a portion adapted to be secured to one outermost end of said cross bar; and
      a guide wheel assembly operably associated with said base and adapted to be disposed within an associated one of said channels of said side rail, said guide wheel assembly comprising at least one wheel mounted for generally horizontal rotational movement relative to said base at an outermost end of said base, the rotational movement of said wheel being disposed against either opposing interior wall surface of the channel so as to prevent binding of said cross bar when said cross bar is moved along said side rails.

2. The apparatus of claim 1, wherein said guide wheel assembly comprises a spaced apart pair of guide wheels.

3. The apparatus of claim 1, wherein said base comprises two pairs of said guide wheels disposed at opposite ends of said base.

4. The apparatus of claim 1, wherein said guide wheel performs said function of guiding said base along said associated side rail without bearing the load of said cross bar on said associated side rail.

5. A vehicle article carrier apparatus for supporting articles above an outer body surface of a vehicle, said apparatus comprising:
   a pair of side rails adapted to be secured to said outer body surface and disposed generally parallel to one another along said outer body surface, each said side rail having a channel extending along at least a major portion of the length thereof;
   a cross bar having a length substantially sufficient to span the distance between said side rails;
   a support bracket assembly disposed at each end of said cross bar, at least one of said support bracket assemblies including:
      a base;
      a neck extending from said base and adapted to be secured to one outermost end of said cross bar;
      a guide wheel assembly operably associated with said base and adapted to be disposed within an associated one of said channels of said side rail, said guide wheel assembly comprising at least one pair of spaced apart wheels mounted for rotational movement relative to said base, said wheels each having a generally vertical axis of rotation such that said wheels are rotatable within a generally horizontal plane and against either opposing interior wall surface of said channel when disposed within said channel to thereby prevent binding of said cross bar relative to said associated side rail when said cross bar is moved along said associated side rail from one end of said cross bar.

6. The apparatus of claim 5, wherein said cross bar comprises a pair of guide wheel assemblies at opposite ends of said base.

7. The apparatus of claim 5, wherein said guide wheel assembly comprises:

a shaft for rotationally supporting said wheels;

one end of said shaft having at least one groove formed circumferentially therearound;

at least one of said guide wheels having a bore for accepting said shaft, said bore including an internal circumferential rib adapted to snap into engagement with a respective one of said grooves when said at least one guide wheel is urged onto said one end of said shaft.

8. The apparatus of claim 5, wherein said base further includes at least one T-lug adapted to fit within said channel for assisting in guiding said bracket assembly along said associated side rail.

9. The apparatus of claim 8, wherein said bracket assembly includes a pair of laterally projecting planar arms, each of said planar arms including a bore, with each bore adapted to receive one of said shafts.

10. The apparatus of claim 9, wherein said pair of planar arms are disposed at opposite ends of said base.

11. A vehicle article carrier apparatus for supporting articles above an outer body surface of a vehicle, said apparatus comprising:

a pair of side rails adapted to be secured to said outer body surface and disposed generally parallel to one another along said outer body surface, each said side rail having a channel extending along at least a major portion of the length thereof;

a cross bar having a length substantially sufficient to span the distance between said side rails;

a support bracket assembly disposed at each end of said cross bar, at least one of said support bracket assemblies including:

a base;

a neck extending from said base and adapted to be secured to one outermost end of said cross bar;

a pair of guide wheel assemblies operably associated with said base at opposite ends of said base, said guide wheel assemblies being adapted to be disposed within an associated one of said channels of said side rail, each said guide wheel assembly comprising at least one pair of spaced apart wheels mounted for rotational movement relative to said base, said wheels each having a generally vertical axis of rotation such that said wheels are rotatable within a generally horizontal plane and against an interior surface of said channel when disposed within said channel to thereby prevent binding of said cross bar relative to said associated side rail when said cross bar is moved along said associated side rail from one end of said cross bar.

12. The apparatus of claim 11, wherein at least one of said guide wheels includes a bore having a circumferential shoulder formed therein; and wherein said base includes a shaft for supporting one pair of said guide wheels thereon, said shaft having at least one circumferential groove adapted to engage with said circumferential shoulder of said at least one guide wheel.

13. The apparatus of claim 11, wherein each of said guide wheels comprises a plastic guide wheel disposed in a horizontal plane so as to rotate about a vertical axis.

14. The apparatus of claim 11, wherein each of said guide wheels comprises a nylon guide wheel disposed in a horizontal plane so as to rotate about a vertical axis.

15. The apparatus of claim 11, wherein a pair of said guide wheel assemblies are disposed on each of said bracket assemblies.

16. The apparatus of claim 11, further comprising a tap plate disposed within said channel of said associated slat and a fastener operably associated with said base, said fastener being operable to engage with said tap plate to secure said base of said at least one bracket assembly at a desired position along said associated slat.

17. A bracket assembly for a cross bar for use with a vehicle article carrier, wherein said bracket assembly is used to secure said cross bar to a side rail of said vehicle article carrier such that said cross bar can be repositioned along said side rail when needed, said bracket assembly comprising:

a neck portion for coupling with an outermost end portion of said cross bar;

a base portion;

at least one horizontally disposed guide wheel operably associated with said base and movable rotationally freely relative to said base, said guide wheel being disposed generally horizontally within an interior area of said side rail so as to make contact with either opposing interior wall surface of said interior area to prevent binding of said cross bar relative to said side rail when said cross bar is moved along said side rail without performing a load bearing function.

18. The bracket assembly of claim 17, wherein said bracket assembly includes two horizontally disposed guide wheels, one each of said guide wheels being disposed at opposite ends of said base portion.

19. The bracket assembly of claim 17, wherein said base portion includes two pairs of guide wheels, with one of said pairs being disposed at opposite ends of said base portion.

20. The bracket assembly of claim 17, wherein said guide wheel is disposed at one longitudinal end of said base.

* * * * *

UNITED STATES PATENT AND TRADEMARK OFFICE
CERTIFICATE OF CORRECTION

PATENT NO. : 6,179,179 B1  
DATED : January 30, 2001  
INVENTOR(S) : Donald R. Potter et al.

Page 1 of 1

It is certified that error appears in the above-identified patent and that said Letters Patent is hereby corrected as shown below:

<u>Title page,</u>
Item [56] References cited, list art cited in IDS:
-- 3,253,755  5/1966  Bott
   3,519,180  7/1970  Bott
   3,545,660  12/1970 Stephen
   3,554,416  1/1971  Bott
   4,133,465  1/1979  Bott --;

<u>Column 1,</u>
Line 59, delete "principal" and substitute -- principle -- therefor;

<u>Column 5,</u>
Line 7, before "wheel" insert -- guide --
Line 9, before "wheel" insert -- guide --
Line 10, before "wheel" insert -- guide --
Line 13, before "wheel" insert -- guide --
Line 17, before "wheel" insert -- guide --

<u>Column 6, claim 1,</u>
Line 5, "thereof:" should be -- thereof; --

Signed and Sealed this

Eleventh Day of September, 2001

*Attest:*

NICHOLAS P. GODICI
*Attesting Officer*   *Acting Director of the United States Patent and Trademark Office*